May 17, 1932.  J. E. DANT  1,859,130
VEHICLE WHEEL LOCK
Filed Oct. 9, 1931
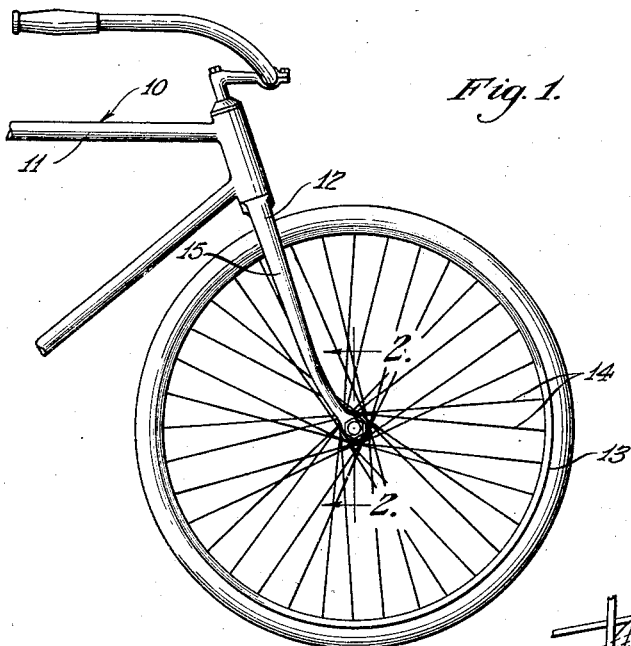
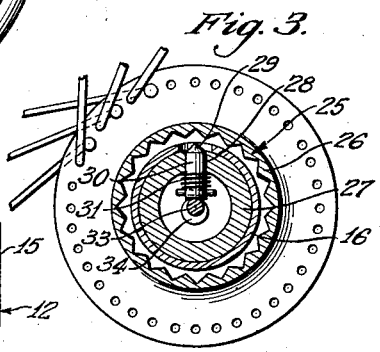
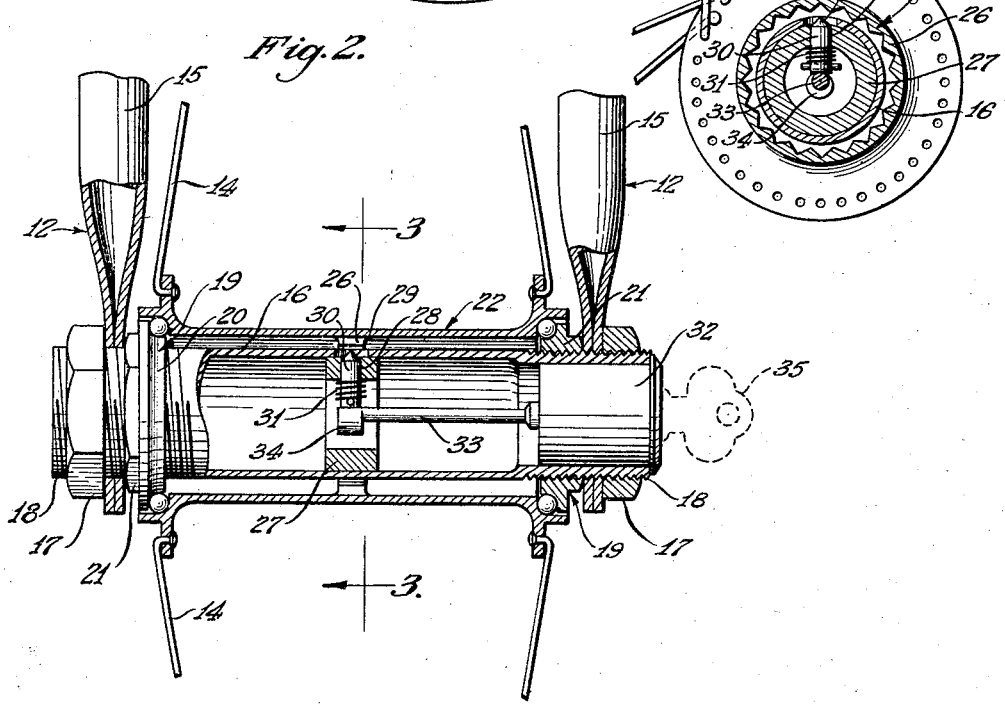
John Edwin Dant.
INVENTOR
BY Victor J. Evans & Co
HIS ATTORNEYS Patented May 17, 1932

1,859,130

UNITED STATES PATENT OFFICE

JOHN EDWIN DANT, OF LOUISVILLE, KENTUCKY

VEHICLE WHEEL LOCK

Application filed October 9, 1931. Serial No. 567,908.

This invention relates to certain novel improvements in vehicle wheel lock, and has for its principal object the provision of an improved construction of this character which will be highly efficient in use and economical in manufacture.

It is an object of this invention to provide a new and efficient locking mechanism for the wheels of vehicles such as bicycles, motorcycles, and the like, and one which will be simple in construction and operation and inexpensive to manufacture.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a fragmentary side elevational view showing the invention applied to a bicycle;

Fig. 2 is a sectional view on line 2—2 in Fig. 1; and

Fig. 3 is a sectional view on line 3—3 in Fig. 2.

While the invention can be applied to other vehicles such, for example, as motorcycles or the like, in the preferred embodiment of the invention illustrated in the drawings the invention is shown applied to a bicycle which is generally indicated at 10 and includes the frame 11, front wheel fork 12, and front wheel 13. The invention to be described may, however, be applied to either front or rear wheel, as desired.

The arms 15 of the fork 12 are retained upon the threaded portions 18 of the relatively stationary hollow axle or shaft 16 by suitable retaining nuts 17; the fork arms 15 being arranged on the axle outwardly of anti-friction elements 19 or bearing structures each of which includes a race 20 having a head 21 for the reception of a wrench whereby to adjust the bearing structures in the threaded portions of the axle into engagement with the hub 22.

The hub of the wheel 13 is indicated generally at 22 and has the spokes 14 suitably attached thereto, the hub being rotatably mounted on the bearing structures 19. On the inner periphery of the hub 22 is an internal ratchet 25 comprising an annular row of teeth 26. This ratchet may be made integral with the hub 22 or be made separate from the hub and be secured thereto in any suitable manner.

Arranged within the hollow axle 16 and held therein in any suitable manner, as by a frictional fit, is a ring 27 in which is provided a slot 28 that is aligned with a slot 29 in the wall of the hollow axle 16. Adapted to be slided through the slots 28 and 29 into engagement with the teeth 26 of the internal ratchet 25, by means presently to be described, is a latching bolt 30 on which is arranged a spring 31.

A key-slotted lock cylinder is indicated at 32 and the same is rotatably mounted in the axle 16. Attached to said cylinder is a shaft 33 on which is a cam 34, the bolt 30 being urged against the shaft 33 by the spring 31, whereby when the cylinder is rotated clockwise by the key 35, as seen looking from right to left in Fig. 3, the cam 34 will engage with the bolt 30 and raise the latter into latching engagement with the teeth 26. The hub 22 cannot thus be rotated upon the bearing structures 19 and hence the wheel 13 cannot be rotated. To release the bolt 30 from engagement with the teeth 26 the cylinder 32 is rotated to release the cam 34 from engagement with the bolt 30 whereupon the spring 31 will urge the bolt out of engagement with the teeth 26 permitting the hub 22 and the wheel 13 to rotate about the bearing structures 19.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention what

I claim as new and desire to protect by Letters Patent is:

1. A vehicle wheel locking mechanism comprising a relatively stationary hollow axle including a wall provided with a slot, a wheel including a hub rotatable about the axle, a ratchet internally of the hub, a latching element in the axle, and a key-controlled mechanism in the axle to urge the bolt through the slot into latching engagement with the ratchet.

2. A vehicle wheel locking mechanism comprising a relatively stationary hollow axle including a wall provided with a slot, a wheel including a hub rotatable about the axle, a ratchet internally of the hub, a latching element and a rotative shaft in the axle, and a cam on the shaft to urge the latching element through the slot into engagement with the ratchet when the shaft is rotated.

3. A vehicle wheel locking mechanism comprising a relatively stationary hollow axle including a wall provided with a slot, a wheel including a hub, a ratchet internally of the hub, a latching element and a rotative shaft in the axle, a cam on the shaft to urge the latching element through the slot into engagement with the ratchet when the shaft is rotated, and a key-slotted rotative member in the axle and attached to the shaft to rotate the latter.

4. A locking mechanism for two-wheeled vehicles comprising, in combination, a relatively stationary hollow axle, including a wall provided with a slot, a wheel including a hub rotatable about the axle, a ratchet internally of the hub, a latching element and a rotative shaft in the axle, a cam on the shaft adapted to urge the latching element through the slot into engagement with the ratchet, when the shaft is rotated, a key-slotted rotative member in the axle and attached to the shaft to rotate the latter, and a spring on the latching element between said wall and shaft normally urging the latching element out of engagement with the ratchet.

In testimony whereof I affix my signature.

JOHN EDWIN DANT.